April 3, 1934.   L. A. BECKER   1,953,098
MACHINE FOR INSERTING CIGARS OR THE LIKE IN CONTAINERS
Filed March 19, 1930   10 Sheets-Sheet 1

INVENTOR
LOGAN A. BECKER
BY
ATTORNEYS

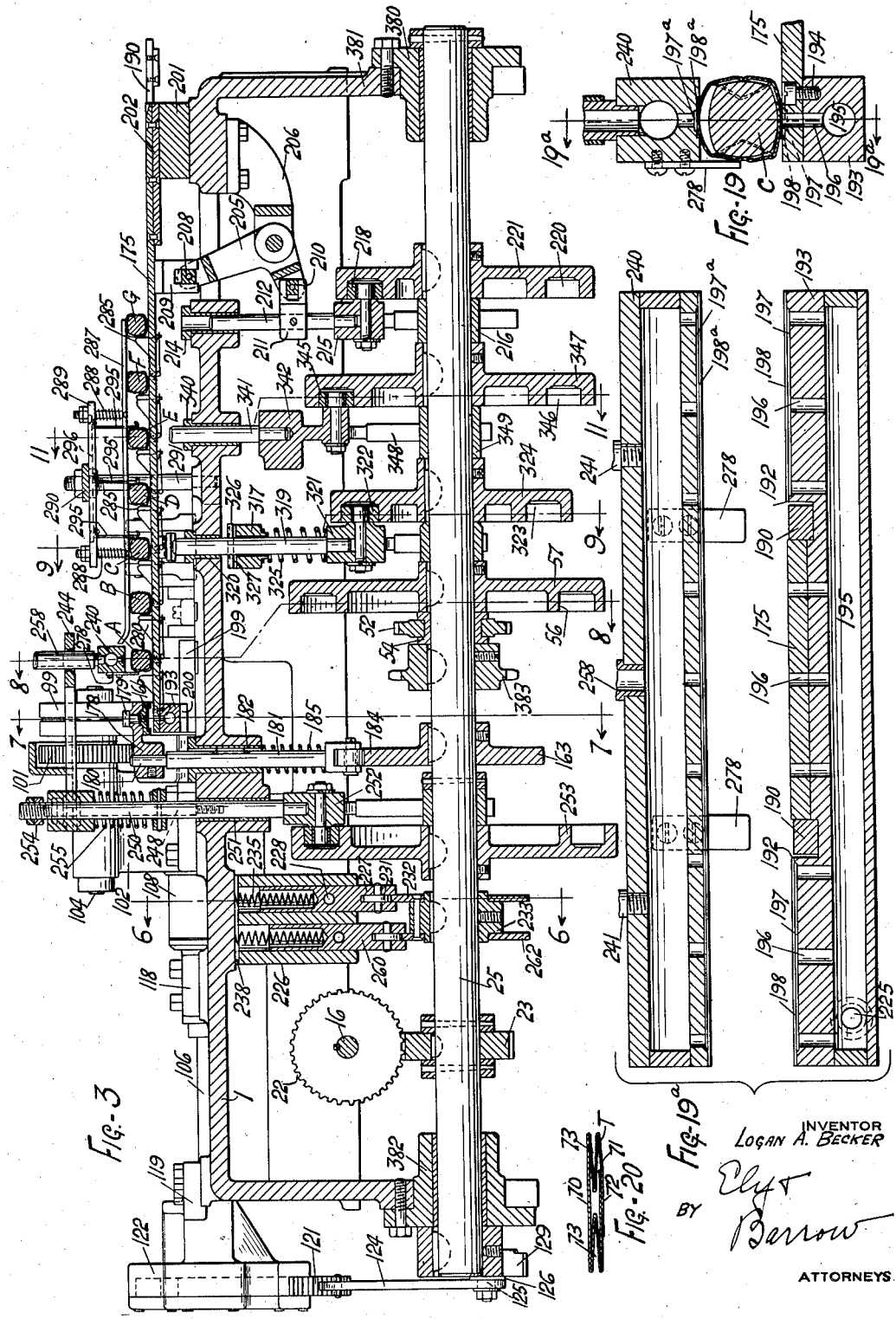

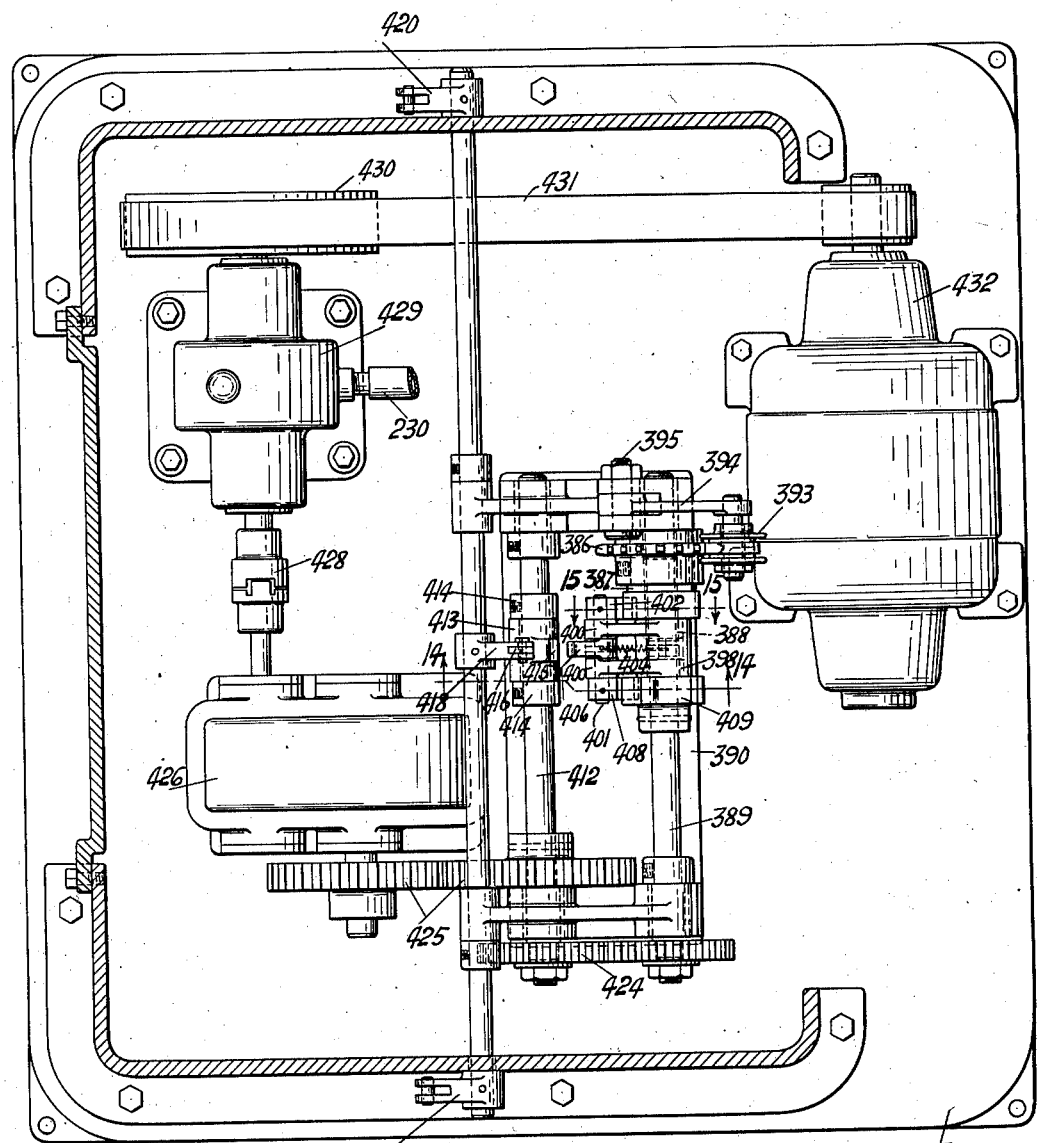
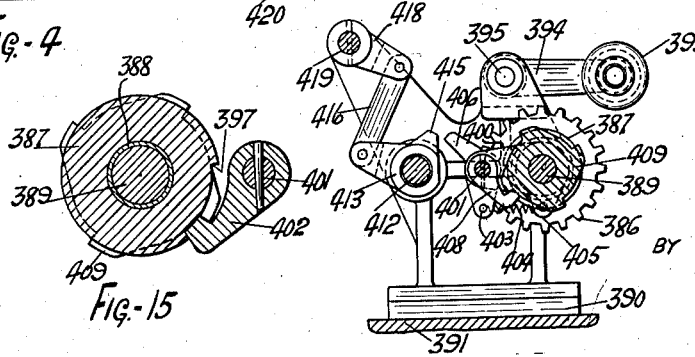

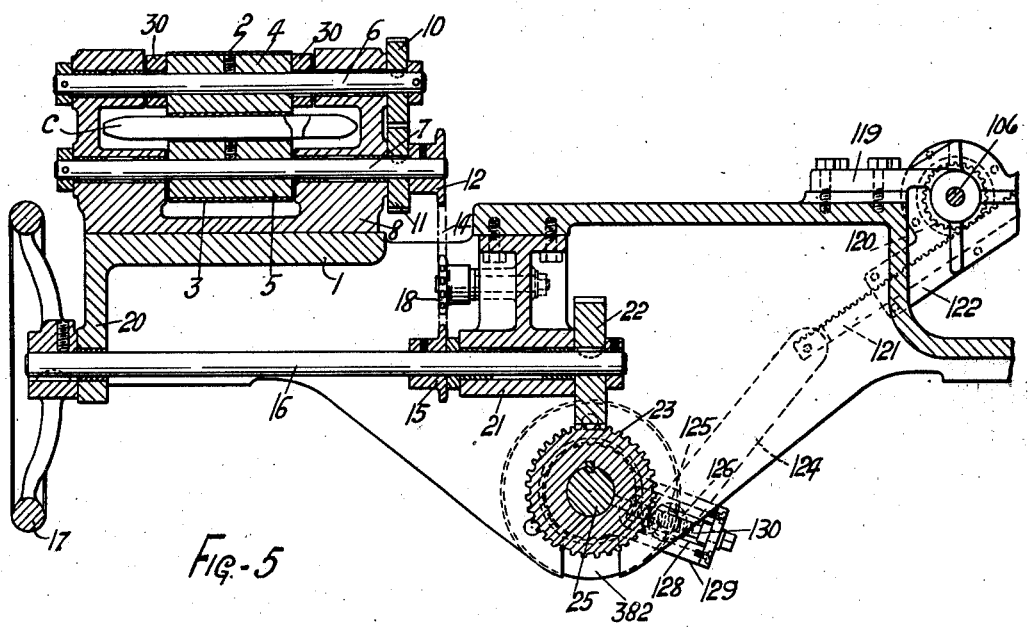
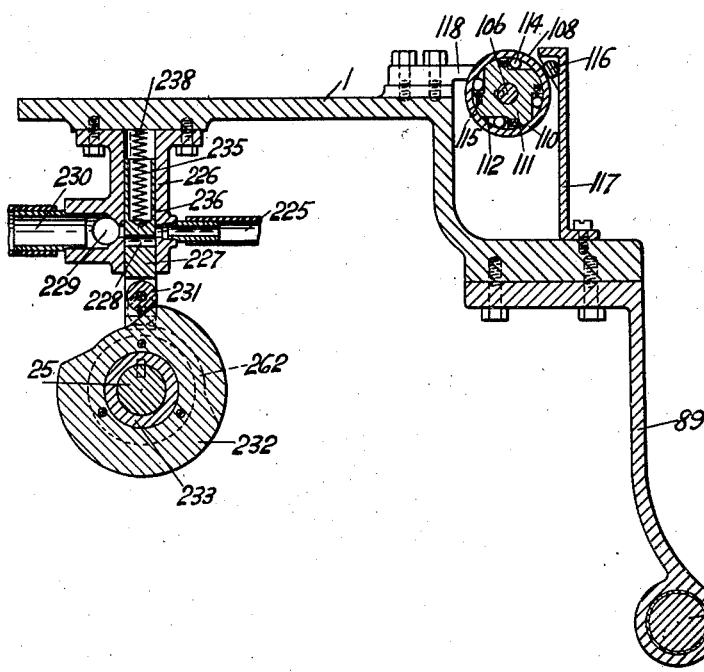

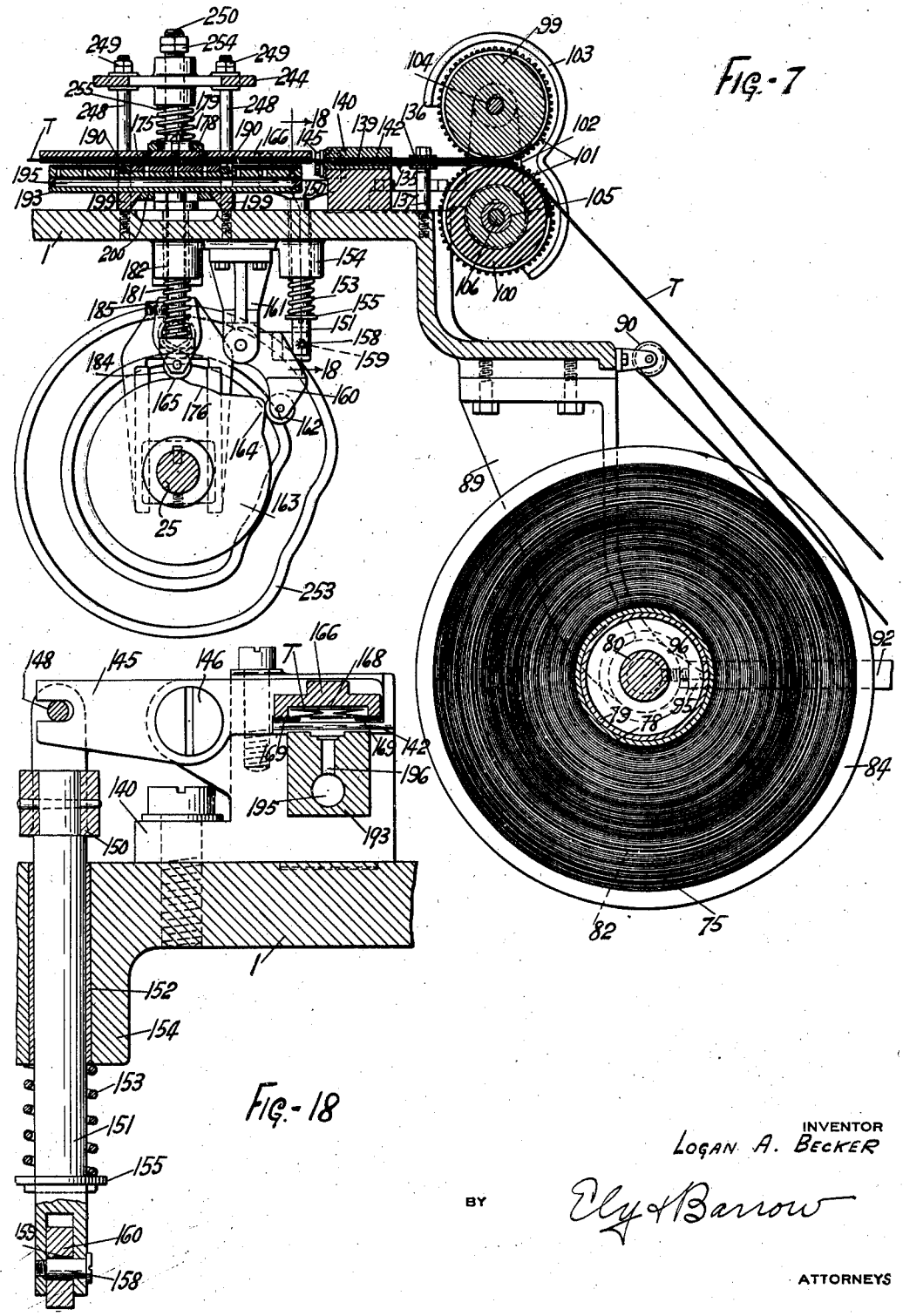

April 3, 1934.  L. A. BECKER  1,953,098
MACHINE FOR INSERTING CIGARS OR THE LIKE IN CONTAINERS
Filed March 19, 1930   10 Sheets-Sheet 7
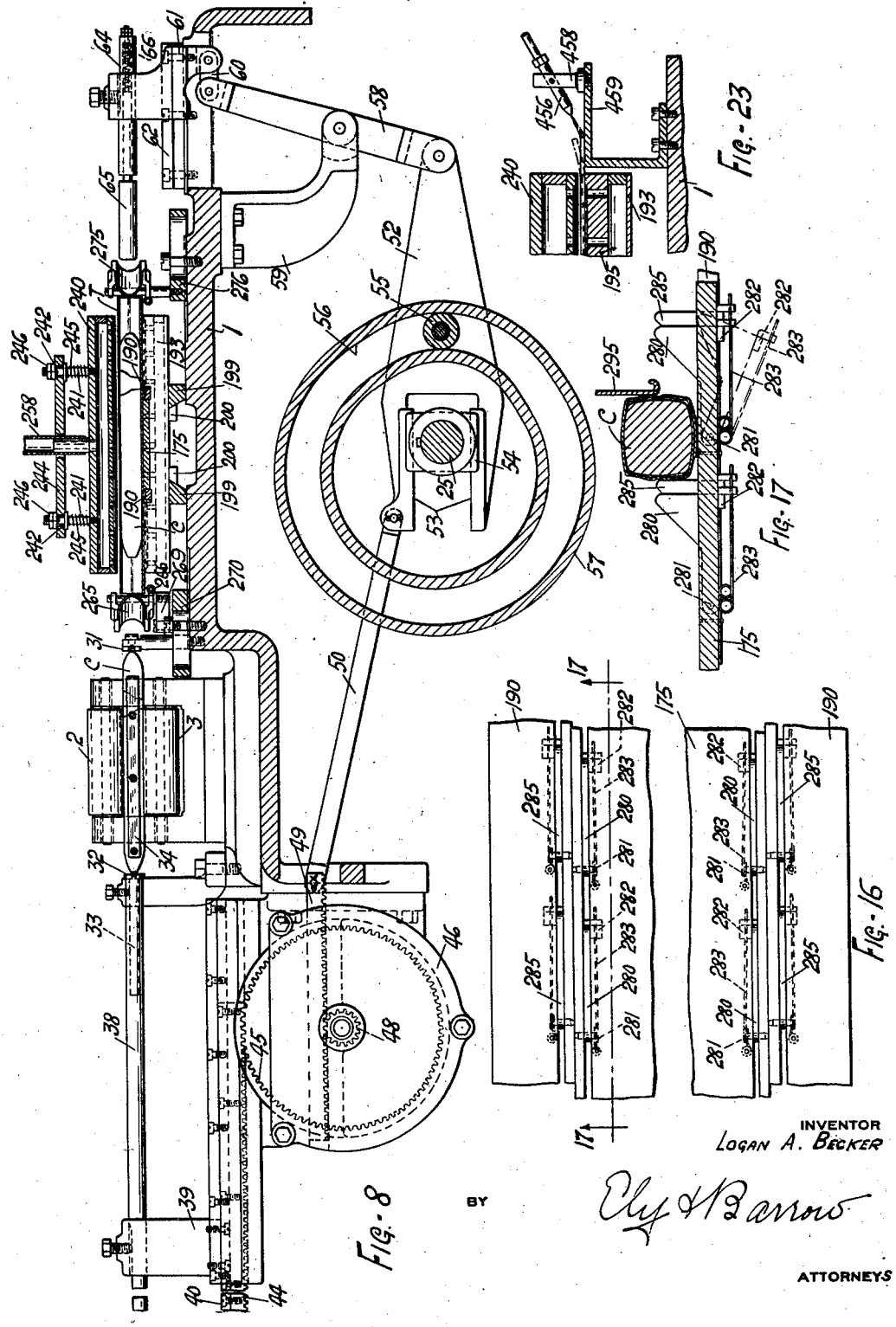
INVENTOR
LOGAN A. BECKER
BY
ATTORNEYS April 3, 1934.   L. A. BECKER   1,953,098
MACHINE FOR INSERTING CIGARS OR THE LIKE IN CONTAINERS
Filed March 19, 1930   10 Sheets-Sheet 8
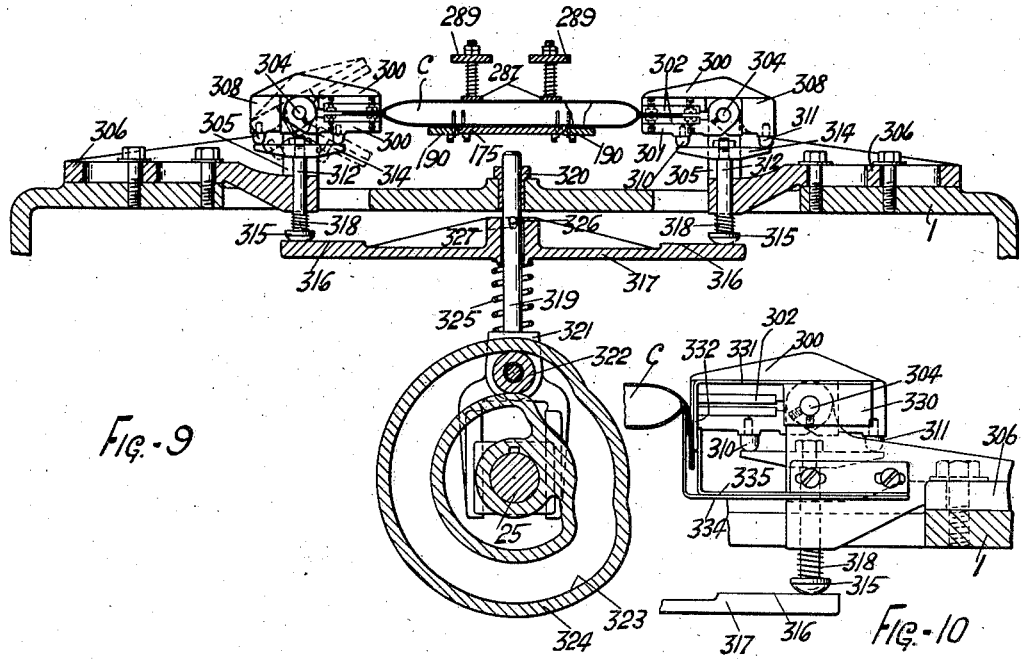
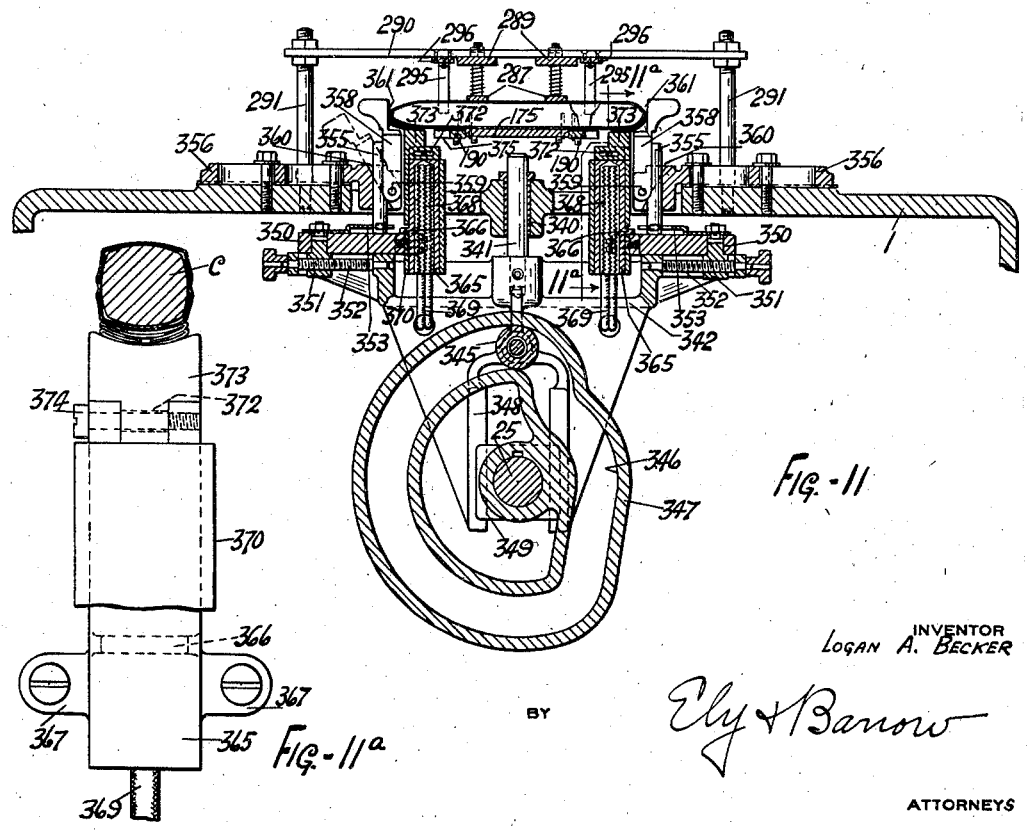
INVENTOR
LOGAN A. BECKER
BY
ATTORNEYS April 3, 1934.  L. A. BECKER  1,953,098
MACHINE FOR INSERTING CIGARS OR THE LIKE IN CONTAINERS
Filed March 19, 1930   10 Sheets-Sheet 9
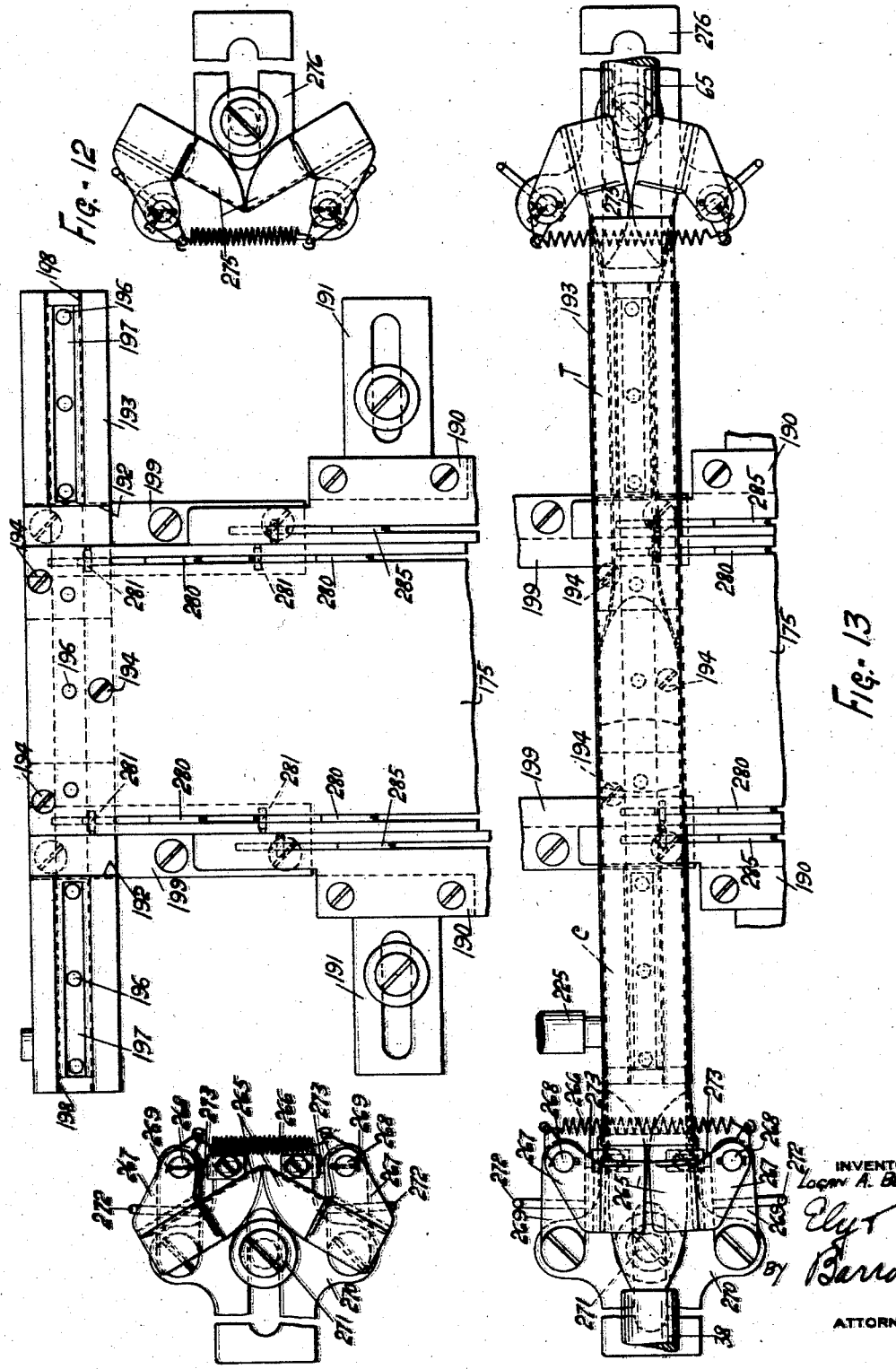
INVENTOR
LOGAN A. BECKER
BY Ely T Barrow
ATTORNEYS April 3, 1934.  L. A. BECKER  1,953,098
MACHINE FOR INSERTING CIGARS OR THE LIKE IN CONTAINERS
Filed March 19, 1930  10 Sheets-Sheet 10

INVENTOR
LOGAN A. BECKER
BY
Ely H Barrow
ATTORNEYS

Patented Apr. 3, 1934

1,953,098

UNITED STATES PATENT OFFICE 1,953,098

MACHINE FOR INSERTING CIGARS OR THE LIKE IN CONTAINERS

Logan A. Becker, Lakewood, Ohio, assignor, by mesne assignments, to Du Pont Cellophane Company, Inc., New York, N. Y., a corporation of Delaware Application March 19, 1930, Serial No. 436,963

57 Claims. (Cl. 93—6)

This invention has for its object the construction of improved mechanism for the insertion of articles in containers. It is particularly designed for the loading of cigars in individual containers, such as tubes or holders, although the general principles of the invention may be applied to other specific purposes. The invention has been illustrated and will be described as especially adapted for the handling and wrapping of cigars, but, as suggested and designed, it is broader in certain of its aspects.

The machine is especially constructed for the handling of tubes of thin, transparent, moisture-proof regenerated cellulose, although other materials may be employed for the container or tube.

The machine is not only adapted to place the cigars or other articles in the container, but is also designed to seal the ends of the container so that a sealed, air-tight package is obtained. In the handling of cigars, the machine is particularly effective and the product is not only attractive, but the air-tight sealing of the cigar preserves the original moisture content of the tobacco, so that the cigars remain fresh and do not deteriorate with age.

The finished product of the machine as shown comprises single or individual cigars in a sealed tubing, but the principles of the invention may be applied to a plurality of cigars in a single container.

The handling of the cigars by the machine and the insertion and sealing are entirely automatic. The materials operated upon present certain difficulties which it is the purpose of the invention to overcome. The machine as shown represents a simple, very efficient means of obtaining the results. The light, delicate wrapping material is handled without tearing and the sealing operation is performed efficiently.

The sheet cellulose, or similar material which constitutes the wrapper is usually coated with a light film of moistureproofing material which is fusible under heat, and the machine is designed to seal the containers by the application of heat and pressure to the end of the container so that the package is sealed air-tight.

In illustrating the invention, a practical operative embodiment has been shown and described, but it will be appreciated that the invention is not limited to exact conformity with the details as set forth, as improvements or modifications may be made thereon, all within the scope of the invention as set forth herein.

In the drawings:

Figure 3 is a longitudinal vertical section along the main or cam shaft, the location of the view being indicated by the line 3—3 of Figure 1;

Figure 4 is a horizontal section on the line 4—4 of Figure 2, showing the various driving elements;

Figure 5 is a vertical section on the line 5—5 of Figure 1, showing the cigar feeding mechanism and the stock or tubing feed device;

Figure 6 is a vertical section on the line 6—6 in Figures 1 and 3;

Figure 7 is a vertical section on the line 7—7 in Figures 1 and 3 which is taken along the line of the stock feed;

Figure 8 is a vertical section on the lines 8—8 of Figures 1 and 3 at the cigar loading position;

Figure 9 is a vertical section on the line 9—9 of Figures 1 and 3 at the creasing or folding position;

Figure 10 is an enlarged view showing the operation of the tucking device, taken on the line 10—10 of Figure 1;

Figure 11 is a vertical section on the line 11—11 of Figures 1 and 3 showing the final sealing operation;

Figure 11a is an enlarged section on the line 11a—11a of Figure 11;

Figure 12 is an enlarged plan view at the loading station with the parts in their normal position;

Figure 13 is a similar view showing the loading operation, the cigar being partially entered into the tube or container;

Figure 14 (Sheet 4) is a detail sectional view on the line 14—14 of Figure 4;

Figure 15 is an enlarged sectional view on the line 15—15 of Figure 4;

Figure 16 is a plan view, with the central portion thereof broken out, showing the feeding or indexing mechanism for advancing the cigars;

Figure 17 is a vertical section on the line 17—17 of Figure 16;

Figure 18 is an enlarged section on the line 18—18 of Figure 7;

Figure 19 (Sheet 3) is an enlarged section showing the cigar in the wrapper or container at the loading position;

Figure 19a is a section on the line 19a—19a of Figure 19;

Figure 20 is an enlarged cross section of a container such as employed in the machine;

Figure 23 illustrates a further improvement which may be incorporated in the machine for assisting in the opening of the tube.

Figure 1:
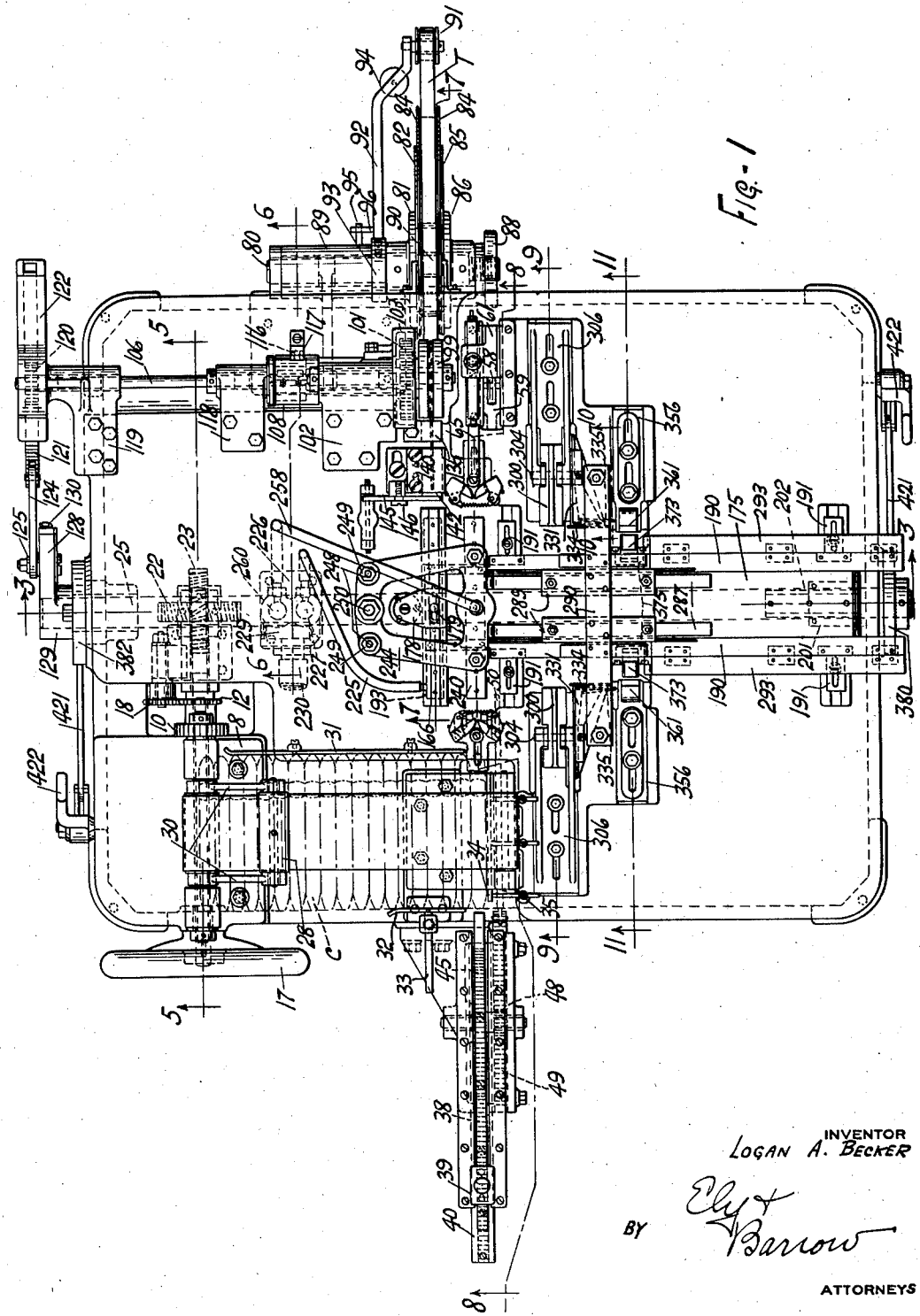
Figure 1 is a plan view of the complete machine.
Figure 2:
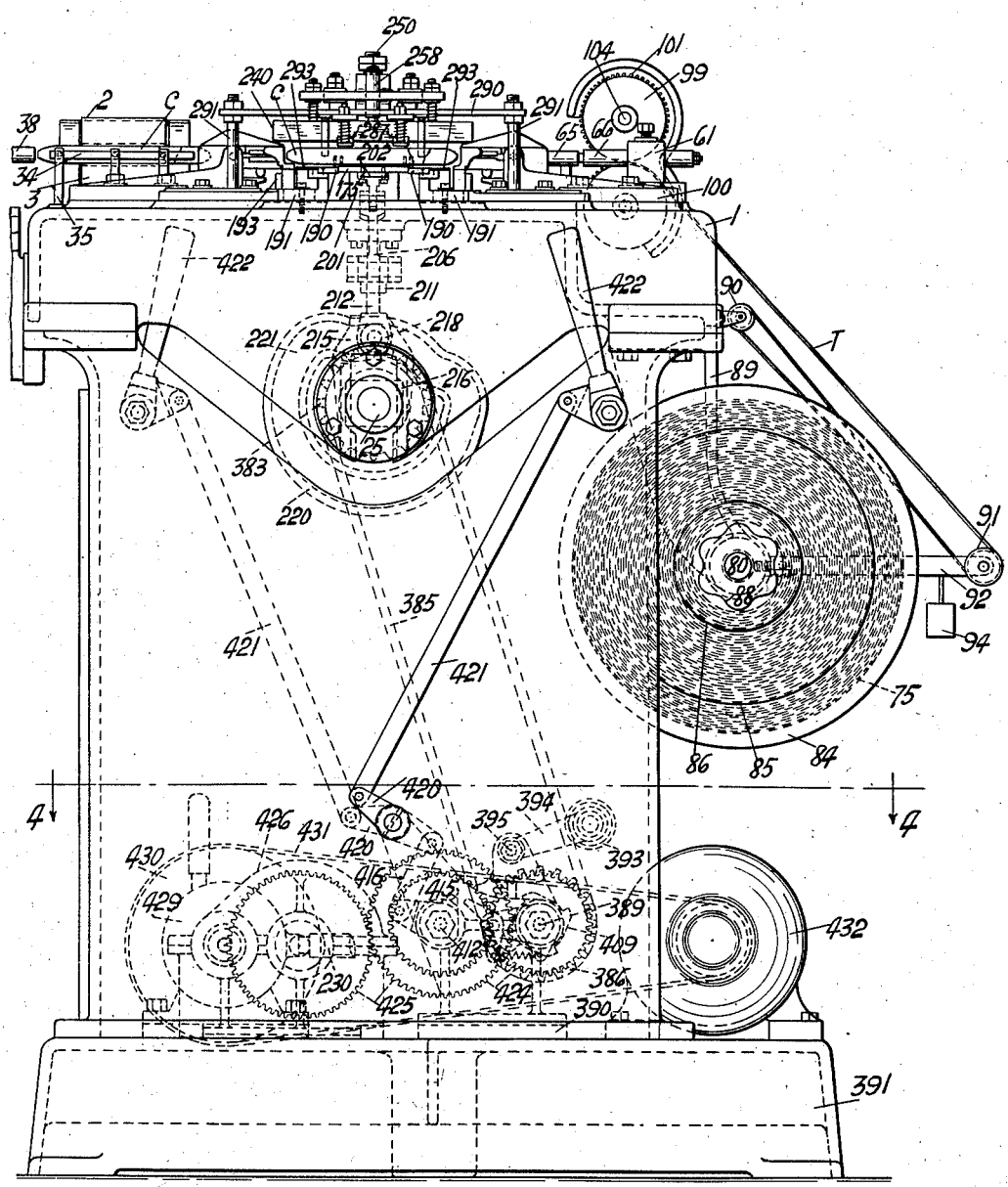
Figure 2 is an end view of the machine looking at that side of the machine at the bottom of Figure 1.

The machine is adapted and designed to operate upon a row or file of cigars as they issue from the finishing operations of cigar making, and is particularly adapted to receive a row of cigars as delivered by the banding machine. The machine of this invention may be made to operate synchronously with the operation of the cigar banding machine, so that the operations of the two machines may be performed economically and no handling of the cigars is required. The packaging operation is performed, therefore, without additional labor.

The machine is also designed to utilize material for the container or pouch which is made up in tubular form and is usually furnished in a large roll or reel, the individual containers being cut off from the leading end of the roll by an automatic cutting device which measures and cuts off a single pouch or container. The stock from which the pouch is cut is preferably formed as a plicated tube with infolded or bellows-like sides and plane upper and lower panels.

The individual tubes are delivered to a transfer device by which they are moved to a position in alignment with the forward cigar as it is delivered to the machine and located in loading position. The pouch, which is open at both ends, is expanded so that it will receive the cigar and while held in expanded position by the operation of suction heads or expanders, the cigar is fed longitudinally into the tube. In order to locate the cigar properly within the tube, a stop or movable abutment may be introduced into the pouch from the end opposite to the entering cigar, although this last feature is not essential.

After the cigar is loaded into the tube, the filled tube is advanced to a second station where the projecting ends of the tube are creased or squeezed together. The ends of the tube are then tucked down at both ends and folded against the lower surface of the package by heated pressure devices which fuse the coating material and make an adhesive seal at each end of the package. The loaded tube is then delivered by the machine and is ready for the final packaging in boxes.

In order to describe the machine, the various stages of the operations will be treated separately, in so far as it is possible to do so.

Cigar feeding mechanism

The row or file of cigars C as they issue from the banding machine or are delivered by the cigar finisher, is received upon a plate 1, which is the bed plate of the machine, and thence between upper and lower belts 2 and 3 spaced at the required distance to engage and feed the cigars forwardly. At the point of admission of the cigars, the belts are trained over upper and lower pulleys 4 and 5, mounted upon shafts 6 and 7 located in a bracket 8 on the table 1 and over corresponding pulleys at the discharge point. The shafts 6 and 7 are connected by gears 10 and 11 so that the belts are driven at equal speeds, the shaft 7 being extended and provided with a sprocket 12, driven by chain 14 from sprocket 15 on the shaft 16 which may be hand operated by the hand wheel 17. An adjustable idler 18 is provided for the chain. The shaft 16 is supported in aligned brackets 20 and 21 depending from the table and is driven by a spiral gear 22, meshing with a second spiral gear 23 on the main cam shaft 25.

The belt 2 is kept at the proper tension by an idler 28 resting upon the belt, being supported in swinging arms 30 carried upon the shaft 6.

As the cigars are fed forward by the belts they are kept in alignment by a rail 31 at one side of the row or file. A second plate 32 mounted for adjustment upon a pin 33 is located near the discharge point for the cigars which are fed against an adjustable stop plate 34 supported upon posts 35 rising from the bed plate of the machine. The belts are preferably driven at greater speed than required to advance the cigar so as to insure that a cigar is located against the stop plate at all times.

The rails or guides 31 and 32 terminate short of the stop plate so as to permit the endwise transfer of the forward cigar, or cigars into the open tube. The transfer of the cigar is done by means of a movable plunger 38 which is adjustably mounted in a bracket 39 carried upon a slide 40 movable in guideways in a bracket 42 attached to the side of the machine. To the underside of the slide is secured a rack 44 which is engaged by a gear 45 supported in a housing 46 depending from the bracket. To the gear 45 is secured a small pinion 48 engaged by a reciprocating rack 49 mounted in a guideway in the housing and extending to and pivotally connected with a link 50, the opposite end of which is pivotally connected to a cross head 52. This cross head is provided with parallel guides 53 which are reciprocable in ways in a collar 54 loosely mounted upon the cam shaft 25. On the cross head is supported a roller 55 which rides in a track 56 in the cam 57 secured to the cam shaft.

The cross head 52 is extended rearwardly and is connected to a lever 58 pivoted in a bracket 59 depending from the bed plate of the machine. A link 60 connects the lever 58 to a slide 61 movable in guideways 62 located on the opposite side of the machine from the plunger 38 and in alignment therewith is secured in the slide an adjustable barrel 64 in which is mounted the yielding plunger 65 which is held in its forward position by a spring 66 in the barrel. The plunger 65 is the locating member which moves toward the plunger 38 as the latter feeds the cigar into position in the tube and contacts the forward end of the cigar at its innermost position, the yielding head upon the locating plunger compensating for variations in the length of cigars.

Stock feeding and cutting mechanism

The tubular stock for the containers or tubes T is furnished in rolls or reels, the material being supplied to the machine as a long tube having upper and lower panels 70 and 71, the latter being provided with the longitudinal seam 72. The bellows-like sides are indicated at 73. As the material is rolled up in the reels 75 under considerable tension the stock is flattened out and is in the form of a thin, narrow ribbon. The roll of material is supported in the machine upon a core 78 which is slipped over a tube 79 mounted upon the end of a shaft 80. On the shaft 80 is the fixed collar 81 having a thin steel plate 82 attached thereto. The reel is enclosed by two cardboard disks 84 and is held by the plate 82 and by a similar plate 85 on the removable collar 86 held in place by a hand nut 88. When a reel is exhausted it is replaced by the removal of the outer plate as will be understood. The reel structure is supported upon a bracket 89 attached to the underside of the bed plate.

In order to maintain a proper tension upon the tubing T and to compensate for any jerks or irregularities in the feeding thereof, the stock is brought over a roller 90 on the bed plate and then over a roller 91 on the end of a pivoted arm 92 attached to a sleeve 93 about the shaft 80. A light counterbalancing weight 94 is carried on the arm 92 which permits the roller to rise when abnormal tension is exerted upon the stock, the arm 92 resting against a stop 95 on the bracket 89 by means of a pin 96.

The stock is fed from the roll intermittently and to the desired and proper length for a container for the cigars. In the form of the invention as illustrated a cigar of the large size is shown and the machine is adjusted to cut the sections of the tube into sizes to accommodate such cigars, and the remaining parts of the machine are correspondingly shown. The mechanism for feeding and cutting the stock will now be described.

After leaving the dance or compensating roll 91 the stock T passes to upper and lower feed rolls which grip the stock and advance it intermittently the required length.

The upper feed roll is indicated by the numeral 99 and the lower feed roll which is preferably of a rubber composition, by the numeral 100. These rolls are geared together at synchronous speed by the intermeshing gearing 101 and are supported upon a bracket 102 attached to the upper surface of the bed plate. The gearing is surrounded by a housing 103 and the upper roll is mounted upon an idler shaft 104. The lower roll is carried upon a tubular sleeve or shaft 105 in which is journaled an oscillating drive shaft 106, the two shafts extending through the bracket 102. The end of the sleeve 105 is connected to a cup 108 at the far side of the bracket and within this cup on the shaft 106 is located the clutch member 110 (Figure 6) by means of which the shafts 106 and 105 are locked together when the former moves in the feeding or forward direction only. This clutch device may be of any preferred form, but that shown in Figure 6 is a practical one.

The clutch is composed of plate 111 having a plurality of angular seats 112 therein in which are located the rollers 114, light springs 115 being employed to press the rollers outwardly. When the shaft 106 is moved in a counter-clockwise direction, as viewed in Figure 6, the rollers will jam between the inner surface of the cup 108 and the member 111, and when the shaft is rotated in the clockwise direction, the driving connection will be freed. To prevent backward movement of the sleeve 105 a roller 116 is located between the cup 108 and a bracket 117 attached to the bed plate, so that the roller will jam between the cup and the bracket and lock the cup. This will not interfere with the forward movement of feed rollers.

The shaft 106 is extended rearwardly of the clutch being journaled in the two brackets 118 and 119, the latter being located outwardly of the bed plate and providing a housing for the mechanism by which the shaft is given its oscillating motion.

On the end of the shaft 106 is located a pinion 120 which is in mesh with a diagonally positioned rack 121 (Figure 5) reciprocable in guideway 122 on the bracket 119. This rack is pivotally connected to one end of a link 124, the other end being pivoted to a pin 125 mounted in an adjustable block 126. This block is slidingly adjusted in a radial guideway 128 formed on a crank arm 129 on the shaft 25. The position of the block is adjusted by the radial screw shaft 130 located in the crank arm and in engagement with the block. By the mechanism just described the stock is fed intermittently forward, the amount of stock in each feeding stroke being determined by the adjustment of the block.

Returning now to the point of delivery of the stock, it will be observed that the surfaces of the feed rollers are grooved and in the grooves are located the upper and lower guiding wires 135 which are attached to a plate 136 carried upon a post 137 adjacent the delivery point of the feed rolls. The wires are located at the upper and lower sides of a slot or passageway in the plate and extend at one side of the plate into the grooves in the upper and lower feed rolls respectively, being curved around the surfaces of the rolls. At their opposite ends the wires extend into and are slidable in a slot or passageway 139 in an adjustable block 140, the forward end of the block having a plate 142 against which the end of the tube is cut off. The wires serve to guide the stock or tube in its passage from the feed rolls to the point where it is cut off and prevent the stock from adhering to the rolls. The adjustment of the block permits different lengths of tube to be cut off in a central position with respect to the center line of the machine.

When the stock is fed forwardly a length projects beyond the block 140 which is cut off by a knife 145 movable over the mouth of the passage 139. This knife is pivoted at 146 on the block, the rear end of the knife being provided with a slot which engages a rod 148 carried in the fork 150 on the upper end of a vertical plunger 151 slidable in a bearing sleeve 152 on the bed plate 1. A light coil spring 153 surrounds the lower end of the plunger between the sleeve and a washer 155 on the plunger. The lower end of the plunger is provided with a cross pin 158 movable in a slot 159 on a rocking cam lever 160 pivotally mounted in a bracket 161 depending from the bed plate. The end of the lever 160 has thereon a roller 162 which is actuated by a cam 163 on the shaft 25, the cam being provided with an abrupt formation 164 which causes the quick actuation of the knife to sever the leading end of the tube T.

In alignment with the passage 139 is an elongated cross head 166 having a channel 168 in its lower face adapted to receive the end of the tube T as it is moved outwardly by the feed rolls. On opposite sides of the channel are thin metal plates or shims 169 which support the end of the tube, or the detached container but permit it to be withdrawn by the agencies to be described.

Beneath the cross head is located a transfer plate 175, the details of which will be described in the next succeeding portion of the specification, this plate being provided with suction means at its inner end to seize the severed length of tubing and remove it from the channel. It is necessary to raise and lower the cross head to effect the transfer.

This last operation is performed by the cam 163 which acts upon the cross head or tube carrier 159 just after the operation of the knife. It will be observed in Figure 7 that there is a slight depression 176 in the face of the cam just forwardly of the formation 164. This depression is negligible as far as the operation of the knife is concerned, but it serves to lower the cross head and carrier momentarily to bring the severed tube in position to be removed by the suction in the face of the transfer plate, and then the formation 165 raises the cross head so that the tube is removed from the channel, whereupon the carrier is restricted to alignment with the passage 139. This action is obtained by supporting the cross head upon a plate 178, through an adjustable connection 179. The plate 178 is vertically adjustable on the reduced stem 180 of a vertically movable rod 181, feathered in a sleeve 182 set in the bed plate. The lower end of the rod 181 carries a roller 184 which rests upon the surface of the cam 163, a coil spring 185 pressing the roller downwardly.

*Tube transfer, cigar inserting and indexing mechanisms*

The transfer or indexing plate 175 which has been previously referred to, is an elongated horizontal slide which extends from the point of delivery of the severed tube to the discharge point for the loaded tube. It is also an indexing plate which advances the container past the several stations from the application of the tube or container through the folding and sealing operations.

The slide or indexing plate is reciprocated between two fixed stationary side plates 190 which parallel the indexing plate to the point of discharge of the loaded container. The side plates are fixed to the bed plate of the machine by adjustable brackets 191 and the rear ends are reduced and receivable in recesses 192 in a cross head 193 when the latter moves forwardly as will be described.

The inner or rear end of the indexing plate carries the cross head or suction head 193 which is transverse to the indexing plate and attached thereto at its midway point as at 194. The suction head is recessed at its point of attachment to the indexing plate so that its major surface is flush therewith. The cross head is provided with a longitudinal passage 195 from which extend a plurality of small openings 196. These passages extend into the surface of the indexing plate, but at the end portions of the head they open into a channel 197 in the face of the head, and closed at their ends, which in turn lead to a slightly wider channel 198, the latter opening at its ends. This formation securely holds the tube and in conjunction with a similar formation on an upper head, serve to spread the tube slightly when the heads are brought together to break the adhesion of the upper and lower panels and permit the access of air within the tube to assist in the opening of the tube.

The indexing plate is supported at its inner end through the medium of the cross head which rests upon ways 199 on the bed plate which are provided with undercut surfaces with which are engaged gibs 200 attached to the suction head. The forward end of the plate 175 is supported upon a block 201 on the bed plate, a gib or key 202 engaging therewith.

The reciprocating movement is imparted to the plate 175 by means of rocking lever 205 pivoted on a bracket 206 depending from the bed plate, one end of the lever having a pin and slot connection 208 with a lug 209 depending from the plate, while the opposite end has a similar connection 210 with a lug 211 attached to a vertical rod 212. The rod 212 slides at its upper end in a sleeve 214 located in the bed plate, the opposite end of the rod being received in the upper end of a fork 215, the arms of which embrace a slide block 216 on the cam shaft 25. A roller 218 is secured to the fork and engages a cam groove 220 in the surface of the cam 21.

Returning to the suction head, it will be observed that suction is intermittently exerted upon the head and thus to the face of the head and slide by a flexible connection 225 which extends to a control head or valve 226 attached to the bed plate wherein is located a plunger 227 having a passage 228 therein which establishes communication at the required times with a transverse passage 229 from which extends a trunk 230 to a source of vacuum. The plunger 227 is provided with a roller 231 which rests upon the cam 232 secured to a collar 233 on the cam shaft. The upper portion of the plunger is hollow and receives a spring 235 which forces the plunger downwardly. When the high portion of the cam 232 is active the passage 228 is brought into alignment with the ports 225 and 229 to seize and hold the tube, but when the tube is to be released the roller rides upon the lower portion of the cam bringing the port 225 into alignment with a vent 236 which communicates with the hollow portion of the plunger which is in turn vented to the atmosphere at 238. The latter operation, which relieves the suction at the head, occurs at the termination of the loading operation when the filled container is to be moved forwardly for the sealing operation.

After the tube is removed from the carrier or channel 166 and held upon the lower suction head 193, the indexing plate moves forwardly to bring the tube into a position beneath an upper suction head 240 and there is a dwell after the forward movement, caused by the configuration of the cam 221 during which time the tube is opened and the cigar inserted. The opening of the tube is performed by lowering the head 240 which exerts suction on the upper panel of the tube and in conjunction with the head 193 spreads the tube to receive the cigar, the suction being maintained until the loaded container is moved forward to the next station. The head 240 is similar to the head 193, except that the suction openings are in the under surface thereof and the channels 197a and 198a extend across the head as shown in Figure 19a. This head is carried upon two pins 241 slidably received in openings 242 located in a horizontal frame 244, springs 245 yieldingly pressing the head downwardly against the nuts 246, and accommodating the machine to variations in thicknesses of cigars of the same nominal size.

The frame 244 is mounted for vertical reciprocation on pins 248 secured in the bed plate at the rear of the cross head having adjusting nuts 249 on the upper end thereof. An actuating rod 250 is passed through and slidable in the frame 244 and extends through a sleeve 251 in the bed plate to a fork 252 similar in construction to the fork 215 previously described. The rod 250 is actuated periodically by the cam 253, so that the upper suction head is lowered at the proper intervals by means of the adjusting nuts 254 at the top of the rod. A spring 255 on the rod 250 serves to elevate the frame sufficiently upon the upward movement of the rod to spread the tube properly. The nuts 254 are for the purpose of moving the upper and lower heads together to the proper distance, while the nuts 249 in conjunction with spring 255 raise the upper head to the proper distance from the lower head to spread the tube to the required extent.

The cross head 240 is connected by a flexible tubing 258 to the valve housing 226 where a plunger 260 similar to the plunger 227 controls the vacuum to the face of the upper cross head. This valve is controlled by the cam plate 262 carried on the collar 233, the release of suction to the upper cross head occurring simultaneously with the release of suction to the lower suction head. The lower portion of the cam 262 extends beyond the lower portion of the cam 232, so that suction is not again exerted upon the upper suction head until the tube is in position beneath it.

It is desirable to provide a snug fit for the cigars in the tube for the sake of giving the best appearance to the package. It is also necessary to guide the cigars accurately into the mouth of the tube to prevent the catching of the band on the edge of the container and to spread the mouth thereof to permit the easy entrance of the cigars. Before the cigar is entered into the tube it will assume the position shown in dotted lines in Figure 19, and it is necessary to start the cigar properly in the tube. For the purposes set forth, a spreader or funnel is provided which is moved into the mouth of the tube and as the cigar is advanced into the tube it opens the tube for the purposes set forth.

This device is shown in detail in Figures 12 and 13. It comprises two scoop shaped pivoted guides or blades 265, the pointed ends of which are rounded as shown and held in opposition by a light coil spring 266 attached to the arms 267 by which the guides are carried. The arms 267 are pivotally mounted on pins 268 on the ends of swinging links 269 pivoted upon a bracket 270 adjustably secured at 271 to the bed plate in alignment with the mouth of the container at loading position and in front of the forward end of the first cigar.

In the position of rest as shown at Figure 12 the pointed ends of the blades or guides 265 are adjacent and withdrawn from the path of the tube against the stops 272 by the spring 266, the links being against the adjustable stops 273 on the bracket. As the cigar is fed forwardly by the plunger 38, its forward end strikes the blades and swings them outwardly so that the pointed ends thereof enter the tube, spread it and form a funnel to guide the cigar into the tube, protecting the edge of the tube, and securing the snug fit which is desirable. Should the cigar be a little fatter than ordinary or be irregular in size the links 269 will yield slightly so as to accommodate these conditions. It will be seen that an extremely flexible and effective guiding means has been provided.

In order to insure the entrance of the locating plunger 65 into the opposite end of the tube, a similar spreader or guide 275 is located at the opposite end of the tube. This guide, however, is not required to be as flexible as the guider for the cigars and accordingly the links 269 have been omitted, the guide being mounted directly upon the adjustable bracket 276.

After the cigar has been fed into the tube and properly located as shown in Figure 8, the suction in the upper and lower heads is released and the indexing plate moves back to take another tube and the loaded container is ready to be moved forwardly for the succeeding operations. In order to prevent the loaded container from being moved backwardly by the indexing plate, fingers 278 are attached to the rear face of the upper suction head and extend downwardly sufficiently to act as a stop for the loaded container.

The forward feeding, which is performed step by step, is accomplished by the means now to be described.

On the indexing plate 175 are located at the requisite intervals a plurality of triangular pivoted dogs or triggers 280, the forward ends of which are perpendicular to the plate and the rear sides sloping. These dogs are pivoted in slots in the plate at 281 and are provided with stops 282 bearing against the underside of the plate and yieldingly maintained in elevated position by light wire springs 283. As the indexing plate moves backwardly the dogs will be depressed as shown in dotted lines in Figure 17 so as to pass beneath the loaded container and to rise behind the container for the forward feeding stroke. The first of these dogs is located between the carrier 166 and the loading position when the indexing plate is retracted, this dog being passed beneath the loaded tube as held by the fingers 278. A sufficient number of the dogs are provided in two parallel rows on the indexing plate to feed the loaded tubes forwardly to the discharge point.

In order to prevent the backward movement of the loaded tubes with the indexing plate, a plurality of detaining dogs 285 are located in slots in parallel rows upon the stationary guide plates 190 on either side of the indexing plates. These dogs are similar in construction to the dogs 280, yielding to permit the forward passage of the loaded tube but rising behind each tube, present their vertical faces to prevent backward movement thereof. These fixed detaining dogs are located slightly forward of the companion pusher or feeding dogs when the indexing plate is retracted to its full extent so as to enable the latter to clear the loaded containers. The operation of the feeding means is clearly shown in Figure 3, each of the pairs of detaining dogs properly locating the container for the succeeding operations. On its forward movement, each feeding dog passes slightly beyond the next fixed dog, the exact location of the container being determined by the position of the fixed dogs against which the loaded containers are moved by the retraction of the indexing plate.

To insure the exact positioning of the loaded containers in their proper positions along the plate, there are provided pairs of light spring fingers 295, depending from bars 296 attached to the cross plate 290. These fingers extend downwardly so as to contact the central portion of the loaded container, yielding slightly with the forward movement thereof so as to retain the containers against the faces of the fixed dogs 285. When the containers are fed forwardly, the light springs will yield to permit the passage thereof.

In order to retain the loaded containers upon the plates, spring held parallel shoes 287 are provided, these shoes being supported upon spring held yielding pins 288 supported upon rails 289 attached to a cross plate 290 carried upon posts 291 rising from the bed plate 1. The elevation of the plate 290 is adjustable to accommodate variations in the thickness of cigars.

Beyond the ends of the shoes the stationary side plates 190 are provided with wings 293 to retain the folded ends of the container in position.

Sealing mechanism

As the loaded container is moved forwardly in the manner described and located by the fixed dogs 285, the successive sealing operations are performed. As viewed in Figure 3 the loaded container occupies seven positions before it is finally discharged from beneath the shoes 287, these positions being indicated by the letters A to G inclusive. The station A is the loading station, the operations at that point having been described. The station B is an idle station at which no operations are performed.

At station C the ends of the container which project beyond the cigar are pressed or creased together as the first operation of the sealing mechanism. This creasing mechanism is shown in Figure 9, and it comprises two devices on opposite sides of the container, each comprising an upper jaw 300 and a lower jaw 301 having wearing plates 302 secured in their opposing faces. These jaws are mounted upon a pin 304 pivoted on a flange 305 formed on the adjustable bracket 306 on the bed plate, the upper jaw being fixed to the pin and the lower jaw pivoted thereon. These jaws will normally spread apart at their inner ends, the jaw 301 by its own weight and the jaw 300 by a counter-balance 308 on the opposite side of the pivot, this position being shown by the dotted lines to the left of Figure 9. In the lower side of the jaw 301 is a rounded bearing stud 310 and in the portion 308 of the upper jaw is a similar stud 311.

Located in the bracket 306 beneath the pivot 304 is a sliding pin 312, the upper end of which carries a cross head 314 to engage the studs 310 and 311. The lower end of the pin 312 is provided with a head 315 which rests upon a bearing surface 316 on the end of a cross arm 317, being moved downwardly by a coil spring 318. The surface 316 is of sufficient extent to permit a range of adjustment for the bracket.

The cross arm 317 which extends beneath the pins upon opposite sides of the machine is slidably mounted upon a vertically movable rod 319 slidable in its upper end in a sleeve 320 set in the bed plate and attached at its lower end to a fork 321 similar in construction to the fork 215. A roller 322 is carried upon the fork 321 and rides in a groove 323 on the cam 324 on the cam shaft 25. The cross arm 317 is supported upon a spring 325 surrounding the rod above the fork, and is guided by a pin 326 through the rod and engaging grooves or notches 327 in the cross arm.

As the cam approaches its upper limit of movement, the cross arm is raised through the spring, which at the upper limit of movement is compressed through the contact of the cross arm with the pins 312 and through the meeting of the jaws on the projecting ends of the pouch, thus the ends of the pouch are squeezed together and prepared for the next operation.

The jaws not only press the end of the tube together but form a transverse crease at the tip of the cigar, a result which may be accentuated by shaping and locating the jaws so that the outer ends thereof are slightly closer together when the jaws are brought together.

The next operation, which is performed at the station D is the tucking which bends the creased ends of the tube downwardly, this operation being shown in Figure 10. To the pin 304 which projects beyond the creasing jaws is secured a block 330 to which is secured the angular plate 331, the end of which is bent downwardly to form a blade 332 which is adjacent the end of the cigar in its container. A pair of plates 334 and 335 are adjustably secured to the side of the bracket 306, these plates extending toward the container and having upright spaced wings between which the blade 332 is moved. The wrapped cigar being located at station D, the movement of the upper blade 332 tucks the creased end of the container downward so that it is vertical and ready for the final sealing operation. The outer plate 335 is preferably extended to a point closely adjacent the sealing station so that the downwardly tucked end of the package will remain in position and be properly delivered to the sealing instrumentalities.

This last-named operation takes place at the station E and consists in folding the tucked end of the container under the located tube and applying heat and pressure to force the end against the lower side of the tube to fuse the coating and seal it in place, the mechanism for which will now be described.

Located in a sleeve 340 in the bed plate is the vertically movable rod 341 set in a cross arm 342 beneath the bed plate. This cross arm supports the final sealing instrumentalities at each side of the machine and raises and lowers them at the proper time by means of a roller 345 in a groove 346 on the face of a cam 347 on the shaft 25. A fork 348 depends from the cross arm and slidingly embraces a collar 349 loosely mounted on the shaft.

Slidably mounted on each side of the cross arm 342 is a plate 350 to the underside of which is attached a nut 351 in screw-threaded engagement with an adjusting screw 352 mounted in the arm. To the upper side of the plate 350 is secured a light angular yoke 353, the inner end of which is elevated above the plate and forked to engage notches in a pin 355 which is vertically movable in an adjustable bracket 356 on the bed plate. This yoke will permit of adjustment of the bracket 356 independent of the adjustment of the plate 350. The inner upper surface of the pin 355 is cut away as shown in Figure 11 and wipes over the outer surface of a tucker arm 358 which is freely pivoted at 359 in an angular notch 360 in the inner end of the bracket 356. The upper end of the tucker arm is formed with an L-shaped or angular recess 361, which effectively tucks the end of the tube under the filled container and in the path of the sealing iron.

When the cross head is lowered with the pin 355, the tucker will fall backwardly in the notch to the dotted line position shown at the left in Figure 11, but as the cross head rises the tucker will be rocked to upright position by the pin 355 and its angular operative face 361 will fold the end of the tube under the filled container as described. Owing to the location of the pins 355 this tucking operation will be accelerated above the movement of the hot sealing irons or pads to be described, which are also carried upon the cross head 342 and the end of the container will be moved into its place beneath the package before the hot seal is applied.

Carried upon the inner end of the plate 350 is a barrel or tube 365 which is supported thereon by a lip 366 resting upon the top of the plate and by lugs 367 through which screws pass into the plate. Within the barrel is located an electrical heating element or cartridge 368 connected by leads 369 to a source of current. An insulating jacket 370 may be placed around the barrel. The top of the barrel is formed with a slot 372 in which is held the adjustable sealing die 373 by means of a bolt 374 passing through a slot in the die. This adjustment in connection with the adjusting screw 352 makes the machine adaptable for a wide range of cigar lengths. The upper surface of the die is shaped to fit against the surface of the cigar and in changing or adapting the machine for various shapes of cigars the dies may be changed. The side rails 190 are cut out or notched as at 375 to permit the action of the heat sealing iron and to provide the adjustment thereof.

As the cross head 342 is raised the end of the package is tucked under by the tuckers and the irons are then brought into contact with the underside of the package to fuse the waterproofing and provide the final seal.

In order to hold the tucked and sealed end in position until the coating has set, the wings 293 previously described are provided, and through the stations F and G the tucked and sealed ends of the tube being held in place by the pressure of the shoes 287.

*Driving mechanism*

The main driving element of the machine is the cam shaft 25 which is supported at the forward or delivery end of the machine in bearing 380 located in a bracket 381 and at the rear end of the machine in a bearing 382. It is driven by a sprocket 383 located centrally of the shaft and connected by chain 385 with a sprocket 386 secured to a drum 387 rotatable upon a sleeve 388 on a horizontal jack shaft 389, located in bearings on a plate 390 carried upon the base 391 of the machine. An idler roll 393 bears against the chain, being supported upon a floating lever 394 pivoted on the plate at 395.

The drum 387 is extended at one side of the sprocket 386 and enlarged being provided with an elongated notch 397. On the end of the sleeve 388 adjacent the drum is an enlarged barrel or cylinder 398 from which extend the two parallel arms 400, in the ends of which is mounted the pin 401, the ends of which extend beyond the arms on either side. On one end of the pin is fixed the pawl 402 which is adapted to engage the notch 397 in the drum. Midway of the arms is located a trigger 403, one side of which is attached by a spring 404 to a lug 405 on the barrel 398 so that the trigger is normally held in the position shown in Figure 14. The opposite end of the trigger is extended as at 406 in the path of operating mechanism for releasing the drive from the power as will be explained.

The other end of the pin 401 carries a second pawl 408 which is adapted to engage for driving purposes one of the teeth on a ratchet 409 pinned to the jack shaft 389. It will be observed that when the parts are as shown in Figures 14 and 15 the jack shaft and the sprocket wheel drum are connected together for rotation by the parts 409, 408, 401 and 402, and that the barrel 398 which carries the pin 401 and its connected elements is rotating with the shaft 389.

The mechanism just described is employed to insure that when the machine is stopped the parts will be in a certain position, and particularly that the hot sealing irons will be lowered away from the container so as to avoid burning the container or injuring the cigar, which is when the shaft 389 is in the position shown in Figures 14 and 15.

Mounted in the plate 390 at the side of the jack shaft 389 is a shaft 412 on which is rotatably mounted a sleeve 413 between collars 414. This sleeve is formed with a lug 415 which is movable by the rocking of the sleeve into the path of the trigger finger 406 and when moved over to intercept the trigger will raise the same and release the pawls 402 and 408 and lock the barrel in that position, the notch 379 being of sufficient length to permit re-engagement of the pawl 402 and the drive at whatever relative position the pawl and ratchet 408 and 409 may be located when the machine is again to be operated. It will be noted that the teeth of ratchet 409 project slightly beyond the periphery of the drum 387, so that, if the machine has been operated by hand during the time the drive is disconnected the pawl 408 will always be engaged by one of the teeth of ratchet 409 at any position of the drum 387 upon resuming the machine operation.

The sleeve 413 is connected by a link 416 with a lever 418 fixed to an operating shaft 419 extending through the machine and connected to lever arms 420 at either side thereof. A link 421 is connected to each arm 420, extends to and is connected with an operating handle 422 at either side of the machine frame so that the machine may be stopped and started by an operator in either position.

The machine is driven by the shaft 389 as described through gearing 424 from the shaft 412 which is connected by gearing 425 to a reduction gear unit 426. The reduction gearing derives its power through a flexible coupling 428 from the shaft of the pump 429, the intake end of which is connected by the pipe 230 to the suction heads through the valve mechanism as described. The shaft of the pump 429 carries a pulley 430 connected by the belt 431 to the motor 432.

*General description of the operation*

It is believed that a brief resume of the operation of the machine will be sufficient as the parts and their functions were fully described during the main portion of the description.

The cigars are fed forwardly by the belts into the path of the feeding plunger 38. The ribbon of tubing is fed to the required extent by the feed rolls 99 and 101 and is cut off by the knife at the intervals between the stock feeding strokes. The lengths of tubing are supported in the carrier 166 until removed by the lower suction head. The tube is then carried forward by the advance of the lower suction head and spread by the lowering and raising of the upper suction head. The cigar is now fed into the spread tubing through the expansible funnel 265. It has been found, however, that the cigar will not normally move beyond the point at which the loading plunger deposits it within the tube and therefore the plunger 65 is not essential.

The loaded container is now advanced to the creasing station, Figure 9, where the ends of the container are pressed together by the jaws 300 and 301. At the next station the ends are turned down by the blade 332, and then at the succeeding station folded under and sealed by the heat and pressure through the elements of Figure 11. The loaded containers are now advanced through the last steps of the machine which serve to iron the sealed end in place. The cigars are fed forwardly by the indexing plate and held in position by the stationary dogs 285 and the pressure rails or shoes 287.

The machine is readily adjustable and adaptable for the range of cigars normally found and different shapes will be effectively loaded, appropriate changes in the heating and sealing irons 373 being made to suit the work in hand. The machine is automatic and will load cigars at a high rate of speed with no injury to the cigars and without damaging the containers. Variations in sizes of cigars of a given run are provided for the machine is so designed and constructed that the delicate wrappers or containers are handled without inury and without spreading the longitudinal seam therein, and the machine is adapted for requisite variations in the cross section of the tube.

Banded cigars are introduced into the containers easily and without injury to band or container. The sealed ends are securely and hermetically held together by the fused coating. The machine supplies its own suction and by the clutch mechanism shown it is so controlled that it will not injure the tubing or the cigar.

The machine effects great economy over the hand insertion of the cigar. It also presents considerable economy in that the stock is delivered to the machine in roll form and the machine makes its own pouch and inserts the cigar therein, sealing it at both ends.

*Modified transfer and tube opening mechanisms*

Figure 21:
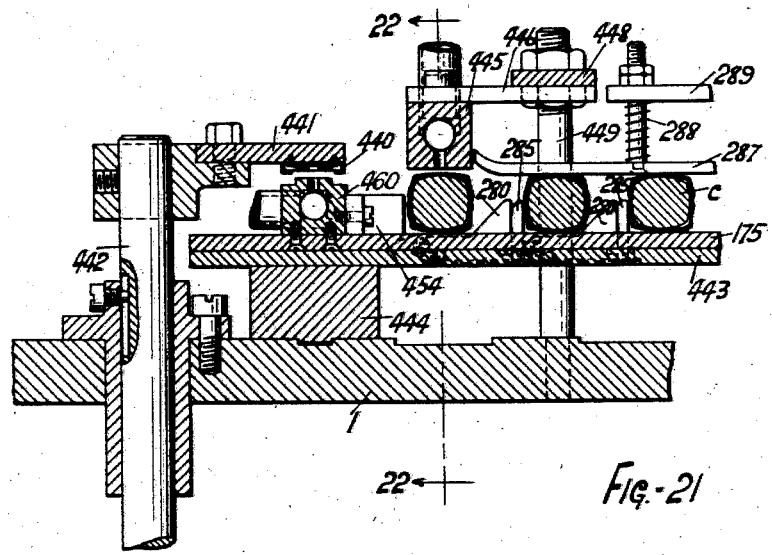
Figure 21 is a section showing a modified form of tube expanding device.
Figure 22:
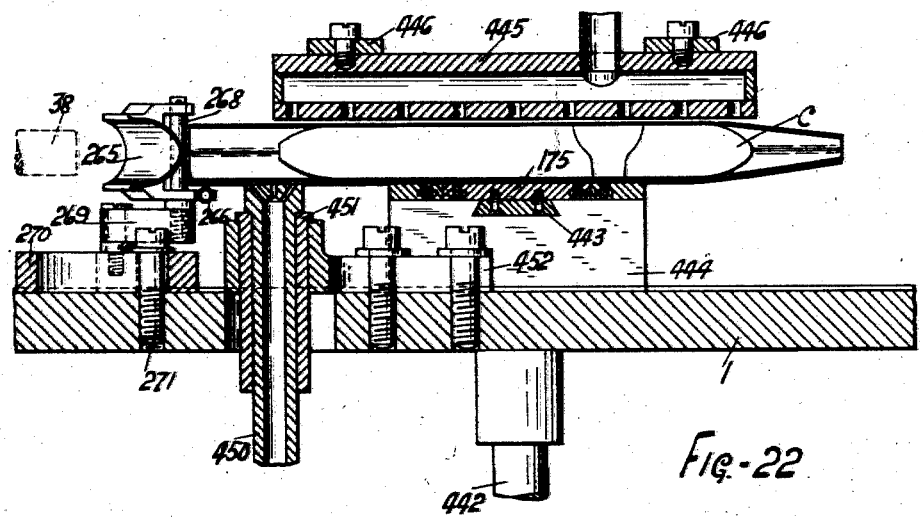
Figure 22 is a section thereof on the line 22—22 of Figure 21, with the cigar fully entered into the tube.

In Figures 21 and 22 there is illustrated a modified form of transfer and tube opening mechanism which may be substituted for the mechanism shown in the main views. In these views those parts of the machine which are not altered for the modification bear similar reference numerals and will not be specifically referred to or described.

In this form the severed tube is received in the channel 440 supported upon a carrier 441 which is in turn mounted upon the upper end of a vertically reciprocable rod 442 movable in the bed plate 1 and actuated in the same manner as the rod 181. The tube is transferred from the channel 440 by means of a suction plate 460 attached to the end of the transfer plate 175 which in this case is provided with a key 443 movable in a guide block 444 on the bed plate.

At the forward limit of its movement the tube, which is held by suction on the upper surface of the plate 460, is in alignment and juxtaposition to a stationary suction head 445 carried upon arms 446 supported upon the bar 448, which in turn is carried upon posts 449 rising from the bed plate.

When the tube is moved over to its position beneath the head 445, the suction is relieved on the movable suction head 460 and the tube is transferred to the under side of the head 445, whereupon the head 460 retreats to its loading position.

As the tube is held by its upper panel, the mouth of the tube is spread by means of a vertically reciprocable plunger or sucker 450 mounted in a guide 4˜˜ in the end of an adjustable bracket 452 mounted upon the bed plate. The plunger is connected to a source of vacuum and is raised by a suitable cam on the cam shaft at the required intervals so that it moves against the lower panel of the tube near its mouth, seizes the same and upon retraction spreads the mouth of the tube so that it will receive the cigar.

The cigar is moved into the container by the plunger 38 through the guiding and spreading funnel 265, this operation taking place while the indexing plate 175 is stationary. On the side of the lower suction head is located a pusher block 454 which engages and advances the loaded container to its next position where it is picked up and moved forwardly by the dogs 280 and 285. The remaining operations are the same as in the main or preferred type of machine.

As a further improvement upon the machine, which may be incorporated with the preferred form thereof, and preferably used without the locating plunger 65, means are provided for breaking the seal between the two panels of the tube, so as to facilitate the opening thereof. This consists in the mounting of a nozzle 456 at the rear or non-loading end of the tube which is directed toward the end thereof, being mounted upon a post 458 rising from a plate 459 attached to the bed plate. The end of the tube lies upon the plate and as the air is directed against the tube it will serve to separate the panels thereof sufficiently to permit air to enter the tube. This operation is not for the purpose of opening the tube, which is done by the operation of the suction heads, but simply to vent the tube and permit its easy opening. The air under pressure is obtained from the side of the pump 429 opposite to the suction side thereof.

The invention shown and described herein is a marked improvement over similar forms of machine and secures new and beneficial results. The claims are entitled to a broad scope and are not necessarily limited to the exact form of machine shown and described. Changes, modifications and improvements may be made within the broader principles of the invention as set forth.

What is claimed is:

1. In a machine for loading articles in tubular containers, the combination of means for feeding tubular stock to advance a predetermined length thereof, means for cutting off a tube from the end of the stock, means for supporting the tube and transferring the same to a succeeding station, means for opening and holding open the tube along the length thereof, and an article inserting means to move the article into the open tube.

2. In a machine for loading articles in tubular containers, the combination of means for feeding tubular stock to advance a predetermined length thereof, means for cutting off a tube from the end of the stock, means for supporting the tube and transferring the same to a succeeding station, a suction device for opening the tube along the length thereof, and an article inserting means to move the article into the open tube.

3. In a machine for loading articles in tubular containers, the combination of stock feeding means, a cutter for severing a tube of predetermined length from the stock, means for spreading the tube at both ends and holding the same in spread condition, and means for inserting an article in the spread tube.

4. In a machine for loading articles in tubular containers, the combination of stock feeding means, a cutter for severing a tube of predetermined length from the stock, means for spreading the tube throughout its length and holding the same in spread condition, and means for inserting an article in the spread tube.

5. In a machine for loading articles in tubular containers, the combination of stock feeding means, a cutter for severing a tube of predetermined length from the stock, a pair of heads having openings in the opposing faces thereof, means for exerting suction upon the faces of the heads to seize and hold the tube, means to separate the heads while suction is maintained thereon, and article inserting means operative while the heads are separated.

6. In a machine for loading articles in tubular containers, comprising the combination of stock feeding means, a cutter for severing a tube of predetermined length from the stock, a support for the severed tube, a suction head reciprocable toward and away from the support and adapted to seize the severed tube, a second suction head movable toward and away from the first suction head to hold and spread the tube, and tube filling means operative while the tube is spread.

7. In a machine for loading articles in tubular containers, comprising the combination of stock feeding means, a cutter for severing a tube of predetermined length from the stock, a support for the severed tube, a suction head reciprocable toward and away from the support and adapted to seize the severed tube, a second suction head movable toward and away from the first suction head to hold and spread the tube in conjunction with the first suction head, and tube filling means operative while the tube is spread.

8. In a machine for loading articles in tubular containers, comprising a support for a reel of stock in tubular form, feeding means to advance the stock to predetermined lengths, a cutter for severing the advanced end of the stock to form a single container, and means to spread the container at both ends to receive the article.

9. In a machine for loading articles in tubular containers, comprising a support for a reel of stock in tubular form, feeding means to advance the stock to predetermined lengths, a cutter for severing the advanced end of the stock to form a single container, and suction means operative upon opposed surfaces of the container to spread the container at both ends to receive the article.

10. In a machine for loading articles in tubular containers, comprising a support for a reel of stock in tubular form, feeding means to advance the stock to predetermined lengths, a cutter for severing the advanced end of the stock to form a single container, means to spread the container at both ends to receive the article, and article feeding means operative while the tube is spread.

11. In a machine for loading articles in tubular containers, comprising a support for a reel of stock in tubular form, feeding means to advance the stock to predetermined lengths, a cutter for severing the advanced end of the stock to form a single container, suction means operative upon opposed surfaces of the container to spread the container to receive the article, and article feeding means operative while the tube is spread.

12. In a machine for loading articles in tubular containers, comprising separable suction devices adapted to be brought into contact with opposed surfaces of the container, means to separate the suction devices to spread the container, and means to direct a jet of air against an end of the container to relieve the adhesion between the sides thereof.

13. In a machine for loading articles in tubular containers, comprising separable suction devices adapted to be brought into contact with opposed surfaces of the container, means to separate the suction devices to spread the container, means to direct a jet of air against an end of the container to relieve the adhesion between the sides thereof, and means to fill the container while the same is opened by the operation of the suction devices.

14. In a machine for loading articles in tubular containers, comprising separable suction devices adapted to be brought into contact with opposed surfaces of the container, means to open the container partially by separation of the devices, a spreader movable into the mouth of the container, and means for directing a jet of air toward one end of the container to break the adhesion between opposite sides thereof.

15. In a machine for loading articles in tubular containers, comprising two separable suction heads extending substantially the length of the container, means to bring the heads into contact with opposite surfaces of the container, and to separate them and partially open the container, and a spreader movable into the mouth of the container.

16. In a machine for loading articles in tubular containers, comprising two separable suction heads extending substantially the length of the container, means to bring the heads into contact with opposite surfaces of the container, and to separate them and partially open the container, and a funnel comprising two pivoted blades movable into the mouth of the container.

17. In a machine for loading articles in tubular containers, comprising two separable suction heads extending substantially the length of the container, means to bring the heads into contact with opposite surfaces of the container, and to separate them and partially open the container, a funnel comprising two pivoted blades movable into the mouth of the container, and yielding mountings for the pivoted blades.

18. In a machine for the uses and purposes set forth, means for supporting and opening a tubular container, a spreader adapted to enter the mouth of the container, the spreader comprising a pair of pivoted blades directed toward each other and separable for the passage of the article, and a yielding support for the blades, operative after the blades are spread apart upon their pivots.

19. In a machine for the uses and purposes set forth, means for supporting and opening a tubular container, a spreader adapted to enter the mouth of the container, said spreader comprising a pair of movable blades, swinging arms on which the blades are pivoted, and yielding means to hold the blades together and to permit the arms to move outwardly.

20. In a machine for the uses and purposes set forth, means for supporting and opening a tubular container, a spreader adapted to enter the mouth of the container, the spreader comprising a pair of pivoted blades directed toward each other and separable for the passage of the article, a yielding support for the blades, operative after the blades are spread apart upon their pivots, and means to move an article between the blades.

21. In a machine for the uses and purposes set forth, means for supporting and opening a tubular container, a spreader adapted to enter the mouth of the container, said spreader comprising a pair of movable blades in supports upon which the blades are mounted, yielding means 22. In a machine for loading articles in tubular containers, a channel for supporting a single tube, a transfer device to remove the tube from the channel and advance it to loading position, a spreading device at the loading position movable toward and from the transfer device while the latter is stationary at the loading position, means to insert an article in the container while it is spread apart, means to move the loaded container forward to successive stations, a creasing device at one station to bring the projecting ends of the tube together, a tucking device at a second station to turn the creased end downwardly, a second tucking device to fold the end beneath the filled container and a sealing device at a subsequent station, and ironing devices at subsequent stations to hold the tucked and sealed end of the container until it is set in sealed position.

23. In a machine for loading articles in tubular containers having a fusible coating, a channel for supporting a single tube, a transfer device to remove the tube from the channel and advance it to loading position, a spreading device at the loading position movable toward and from the transfer device while the latter is stationary at the loading position, means to insert an article in the container while it is spread apart, means to move the loaded container forward to successive stations, a creasing device at one station to bring the projecting ends of the tube together, a tucking device at a second station to turn the creased end downwardly, a second tucking device to fold the end beneath the filled container and a heat sealing device at a subsequent station, and ironing devices at subsequent stations to hold the tucked and sealed end of the container until it is set in sealed position.

24. In a machine for loading articles in tubular containers having a fusible coating, a channel for supporting a single tube, a transfer device to remove the tube from the channel and advance it to loading position, a spreading device at the loading position movable toward and from the transfer device while the latter is stationary at the loading position, means to insert an article in the container while it is spread apart, means to move the loaded container forward to successive stations, a creasing device at one station to bring the projecting ends of the tube together, a tucking device at a second station to turn the creased end downwardly, a second tucking device to fold the end beneath the filled container and a heat and pressure sealing device at a subsequent station, and ironing devices at subsequent stations to hold the tucked and sealed end of the container until it is set in sealed position.

25. In a machine for the uses and purposes set forth, a reciprocating suction device, means at one point of travel of the device to deliver a collapsed elongated tube in a direction longitudinal of itself to be held on the suction device by the suction, a second suction device at a second point in the travel of the first suction device, means to bring the suction devices together to engage opposite sides of the tube and to spread the tube, and an article feeder operative to load the spread tube.

26. In a machine for the uses and purposes set forth, a reciprocating suction device, means at one point of travel of the device to deliver a tube to be held thereon by the suction, a second suction device at a second point in the travel of the first suction device, means to bring the suction devices together to engage opposite sides of the tube and to spread the tube, an article feeder operative to load the spread tube, and an article guiding means movable into the mouth of the tube ahead of the feeder.

27. In a machine for the uses and purposes set forth, a reciprocating suction device, means at one point of travel of the device to deliver a collapsed elongated tube in a direction longitudinal of itself to be held on the suction device by the suction, a second suction device at a second point in the travel of the first suction device reciprocable transversely of the first suction device to engage opposite sides of the tube and to spread the tube, and an article feeder operative to load the spread tube.

28. In a machine for the uses and purposes set forth, a reciprocating suction device, means at one point of travel of the device to deliver a tube to be held thereon by the suction, a second suction device at a second point in the travel of the first suction device reciprocable transversely of the first suction device to engage opposite sides of the tube and to spread the tube, an article feeder operative to load the spread tube, and an article guiding means movable into the mouth of the tube ahead of the feeder.

29. In a machine for the uses and purposes set forth, a head having a suction opening therein, a channel adapted to support a tube therein, means for moving the channel relative to the suction head, means for spreading the tube, and means for loading the tube while one side thereof is held by suction.

30. In a machine for the uses and purposes set forth, a head having a suction opening therein, a channel, means for introducing the forward end of a length of tubing into the channel and severing it to leave a tube therein, means for separating the channel and the suction head, means for spreading the tube, and means for loading the tube while one side thereof is held by suction.

31. In a machine for the uses and purposes set forth, a head having a suction opening therein, a channel, means for introducing the forward end of a length of tubing into the channel and severing it to leave a tube therein, and means for separating the channel from the head to transfer the tube to the head.

32. In a machine for the uses and purposes set forth, a reciprocating plate, a head on the plate having a suction opening in the upper surface thereof, a channel above the head, a support for the channel by which it may be raised and lowered to deposit a tube on the head, means to spread the tube, and means to load the tube.

33. In a machine for the uses and purposes set forth, a reciprocating plate, a head on the plate having a suction opening in the upper surface thereof, a channel above the head, means to introduce the leading end of a strip of tubing in the channel and cut off a length thereof to constitute a single tube, a support for the channel by which it may be raised and lowered to deposit a tube on the head, means to spread the tube, and means to load the tube.

34. In a machine for the uses and purposes set forth, a head having a suction opening in a surface thereof, a channel, means to feed a tube lengthwise of the channel, and means to cause the channel and head to be moved relatively to deposit a tube on the head.

35. In a machine for the uses and purposes set forth, a reciprocating head having a suction opening in a surface thereof, a channel, means to introduce the leading end of a strip of tubing in the channel and cut off a length thereof to constitute a single tube, means to separate the channel and head to deposit a tube on the head, means to spread the tube, means to load the tube, means to fold an end of the tube, and means to seal an end of the tube after it is filled.

36. In a machine for the uses and purposes set forth, a reciprocating indexing plate, a head having a suction opening in a surface thereof, a channel, means to bring the head and channel together to deposit a tube on the head, means to spread the tube, means to load the tube, means to fold both ends of the tube, and means to seal both ends of the tube after the filling operation.

37. In a machine for the uses and purposes set forth, a reciprocating indexing plate, a cross head at one end of the plate having a suction opening in the upper surface thereof, a channel above the cross head, means to introduce the leading end of a strip of tubing in the channel and cut off a length thereof to constitute a single tube, a support for the channel by which it may be raised and lowered to deposit a tube on the cross head, means to spread the tube, and means to load the tube, means to fold both ends of the tube and means to seal both ends of the tube after the filling operation.

38. In a machine for the uses and purposes set forth, a head having a suction opening in a surface thereof, a channel, means to deposit a tube from the channel onto the head, means to spread the tube, means to hold the tube, and means to press the sides of the tube together with heat and pressure, whereby a fusible coating on the tube seals the same.

39. In a machine for the uses and purposes set forth, a reciprocating indexing plate, a cross head at one end of the plate having a suction opening in the upper surface thereof, a channel above the cross head, means to introduce the leading end of a strip of tubing in the channel and cut off a length thereof to constitute a single tube, a support for the channel by which it may be raised and lowered to deposit a tube on the cross head, means to spread the tube, means to load the tube, and means to press the sides of the tube together with heat and pressure, whereby a fusible coating on the tube seals the same.

40. In a machine for the uses and purposes set forth, a reciprocating indexing plate, a cross head at one end of the plate having a suction opening in the upper surface thereof, a channel above the cross head, a support for the channel by which it may be raised and lowered to deposit a tube on the cross head, means to spread the tube, means to load the tube, and means to press the sides of the tube together and against a surface of the tube with heat and pressure, whereby a fusible coating on the tube seals the same.

41. In a machine for the uses and purposes set forth, a reciprocating indexing plate, a cross head at one end of the plate having a suction opening in the upper surface thereof, a channel above the cross head, means to introduce the leading end of a strip of tubing in the channel and cut off a length thereof to constitute a single tube, a support for the channel by which it may be raised and lowered to deposit a tube on the cross head, means to spread the tube, means to load the tube, and means to press the sides of the tube together and against a surface of the tube with heat and pressure, whereby a fusible coating on the tube seals the same.

42. In a machine for the uses and purposes set forth, a reciprocating indexing slide to advance the work through the successive stations, said slide including a suction device for holding an empty folded tube on the indexing device, means cooperating with the suction device to spread the tube, an article inserting means operable on the spread tube, and tube end folding and sealing devices arranged along the indexing mechanism.

43. In a machine for the uses and purposes set forth, an indexing mechanism to advance the work through successive stations, said device including a suction device for holding an empty folded tube on the indexing device, means cooperating with the suction device to spread the tube, an article inserting means and an expansible funnel operable on the spread tube, and tube end folding and sealing devices arranged along the indexing mechanism.

44. In a machine for the uses and purposes set forth, an indexing mechanism to advance the work through successive stations, said device including a suction device for holding an empty folded tube on the indexing device, means cooperating with the suction device to spread the tube, an article inserting means operable on the spread tube, tube end folding and sealing devices arranged along the indexing mechanism, and jaws arranged at the side of the indexing mechanism adapted to press the sides of the tube together.

45. In a machine for the uses and purposes set forth, an indexing mechanism to advance the work through successive stations, said device including a suction device for holding an empty folded tube on the indexing device, means cooperating with the suction device to spread the tube, an article inserting means and an expansible funnel operable on the spread tube, tube end folding and sealing devices arranged along the indexing mechanism, and jaws arranged at the side of the indexing mechanism adapted to press the sides of the tube together.

46. In a machine for the uses and purposes set forth, an indexing mechanism to advance the work through successive stations, said device including a suction device for holding an empty folded tube on the indexing device, means cooperating with the suction device to spread the tube, an article inserting means operable on the spread tube, tube end folding and sealing devices arranged along the indexing mechanism, jaws arranged at the side of the indexing mechanism adapted to press the sides of the tube together, and heating means to fuse an adhesive coating on the tube to form a seal.

47. In a machine for the uses and purposes set forth, an indexing mechanism to advance the work through successive stations, said device including a suction device for holding an empty folded tube on the indexing device, means cooperating with the suction device to spread the tube, an article inserting means and an expansible funnel operable on the spread tube, tube end folding and sealing devices arranged along the indexing mechanism, jaws arranged at the side of the indexing mechanism adapted to press the sides of the tube together, and heating means to fuse an adhesive coating on the tube to form a seal.

48. In a machine for filling and sealing containers composed of material having a fusible coating thereon, means for filling the container, a pair of jaws movable to press the projecting end of the container together, means to tuck the end beneath the container, and a heated sealing iron operable in conjunction with the tucking means.

49. In a machine for filling and sealing containers composed of material having a fusible coating thereon, means for filling the container, a pair of jaws movable to press the projecting end of the container together, means to tuck the end beneath the container, and a heated sealing iron having an operative face contoured to fit a cigar and operable in conjunction with the tucking means.

50. In a machine for filling and sealing tubes composed of material having a fusible coating thereon, means for filling the tube, a pair of jaws movable to press the projecting end of the tube together, means to tuck the end under, and a reciprocable heated sealing iron operable in conjunction with the tucking means.

51. In a machine for inserting articles in tubes comprising means to open a collapsed tube throughout its length preparatory to the insertion of an article therein, and means to direct a blast of air against the end of the collapsed tube to aid in opening it.

52. In a machine for inserting articles in tubes comprising means to open a collapsed tube throughout its length preparatory to the insertion of an article therein, and means to direct a blast of air against one end of the collapsed tube to aid in opening it, and an article inserting device located at the opposite end of the tube.

53. In a machine for inserting articles in tubes comprising means to spread the tube throughout its length preparatory to the insertion of an article therein, and means to direct a blast of air against one end of the tube, and an article inserting device and expansible funnel located at the opposite end of the tube.

54. In a machine for inserting articles in tubes comprising means to spread the tube throughout its length preparatory to the insertion of an article therein, and means to direct a blast of air against one end of the tube, and an article inserting device and expansible funnel located at the opposite end of the tube and adapted to enter the tube.

55. In a device for handling and opening tubes for filling purposes, a plate adapted to be brought in contact with a surface of the tube, said plate having a slot therein open at the ends, and means to exert suction in the face of the plate at the slot.

56. In a device for handling and opening tubes for filling purposes, a plate adapted to be brought in contact with a surface of the tube, said plate having a slot therein open at the ends, and a secondary slot opening into the first-named slot and having communication with a source of suction.

57. A machine of the character described, comprising a support for an article in a wrapper having a fusible surface, a heated member to fuse the surface movable toward and away from the article during the operation of said machine, and means for stopping the machine operable only with the heated member removed from the article.

LOGAN A. BECKER.